UNIVERSAL MONAURAL-BINAURAL PHONOGRAPH PICKUP CARTRIDGE

Filed Aug. 21, 1959 2 Sheets-Sheet 1

INVENTORS
WALTER SANFIELD
DUANE E. PUNKAR

BY Francis J. Klempay
ATTORNEY

UNIVERSAL MONAURAL-BINAURAL PHONOGRAPH PICKUP CARTRIDGE

Filed Aug. 21, 1959

INVENTORS
WALTER SANFIELD
DUANE E. PUNKAR

BY Francis J. Klempay
ATTORNEY

United States Patent Office 3,215,786

Patented Nov. 2, 1965

3,215,786

UNIVERSAL MONAURAL-BINAURAL PHONOGRAPH PICKUP CARTRIDGE

Walter Sanfield and Duane E. Punkar, Conneaut, Ohio, assignors to The Astatic Corporation, Conneaut, Ohio, a corporation of Ohio Filed Aug. 21, 1959, Ser. No. 835,217
1 Claim. (Cl. 179—100.41)

The present invention relates generally to the art of recording and reproducing sound and more particularly to the provision of a universal phonograph pickup cartridge which is adapted to be employed in playing all of the most widely employed types of phonograph record discs now in existence.

The phonograph art is experiencing at the present time a great amount of commercial activity in binaural or stereophonic reproduction. The generally accepted system of recording and reproducing binaural or stereophonic sound evisions providing a single V-shaped record groove whose side walls are each modulated with a channel of recorded intelligence at an angle of forty-five degrees with respect to the horizontal surface of the record disc. There are thus provided two channels of recorded intelligence in the continuous and spirally V-shaped record groove and such a record disc is usually referred to as a 45–45 type of stereophonic record disc.

In addition to stereophonic record discs, many monaural record discs employing a small record groove or a microgroove are in existence and being sold. Further, there are also in eixstence many monaural record discs employing a "coarse" or relatively large record groove. As will be understood by those skilled in the art, microgroove record discs are adapted to be played with a relatively small stylus tip while the coarser record discs are played with a larger stylus tip. Almost all presently existing monaural record discs are of the lateral cut variety—i.e. the single channel of recorded intelligence is modulated laterally in the record groove in general parallel relation with respect to the horizontal surface of the record disc.

It is the primary or ultimate object of the present invention to provide a universal phonograph pickup cartridge which is adapted for use in the reproduction of sound from all of the most widely employed and presently existing types of record discs—including the 45–45 types of microgroove stereophonic record discs, the lateral cut type of microgroove monaural record discs and the lateral cut type of coarse monaural record discs.

Still another object of the invention is to provide the universal phonograph pickup cartridge having a plurality of selectively useable stylus tips which is responsive to driving forces disposed at angle of forty-five degrees with respect to the horizontal surface of a record disc for playing stereophonic record discs and which is also responsive to lateral forces applied in general parallel relation with respect to the horizontal surface of a record disc for playing monaural record discs.

Another object of the invention is to provide a universal monaural-binaural phonograph pickup cartridge which, when used in connection with monaural record discs, is insensitive to and/or will not audibly reproduce vertical movement of the then operative stylus tip. This insures against reproduction of extraneous noise and is particularly advantageous in limiting any output due to the well known "pinch effect."

A further object of the invention is the provision of a universal monaural-binaural phonograph pickup cartridge which embodies two piezoelectric transducer elements of the "bender type" as opposed to the torque or twister type transducer elements utilized in prior art devices. The use of bender type transducer elements contributes in providing a relatively high level of output, superior compliance and excellent separation between the two stereophonic channels.

A still further object of the present invention is to provide a new and novel coupling member or nosepiece for drivingly interconnecting the stylus tips to the transducer elements. The coupling member or nosepiece comprises mechanical force transmitting and/or dissipating linkages which insure complete channel separation when playing stereophonic record discs and which transmit in a desired manner or dissipate vertical forces when playing monaural record discs.

As will be hereinafter more fully apparent, the phonograph pickup cartridge embodies a pair of selectively useable and different size stylus tips for selectively driving two piezoelectric transducer elements in a novel and highly efficient manner. One of the stylus tips independently actuates both transducer elements for playing microgroove stereophonic record discs and for playing microgroove monaural record discs while the other of the stylus tips actuates the transducer elements simultaneously to reproduce signals from coarse monaural record discs.

The above, as well as other objects and advantages of the present invention, will become more readily apparent upon consideration of the following specification and the accompanying drawing wherein there is disclosed a preferred embodiment of the invention constructed in accordance with the teachings thereof.

Figure 1:
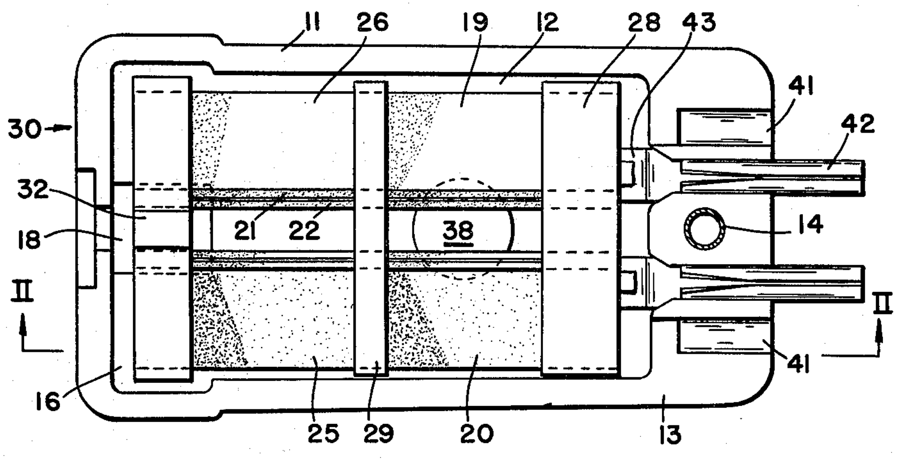
FIGURE 1 is a fragmentary plan view of the lower half of a phonograph pickup cartridge constructed in accordance with and embodying the principles of the present invention.
Figures 2, 3, 4:
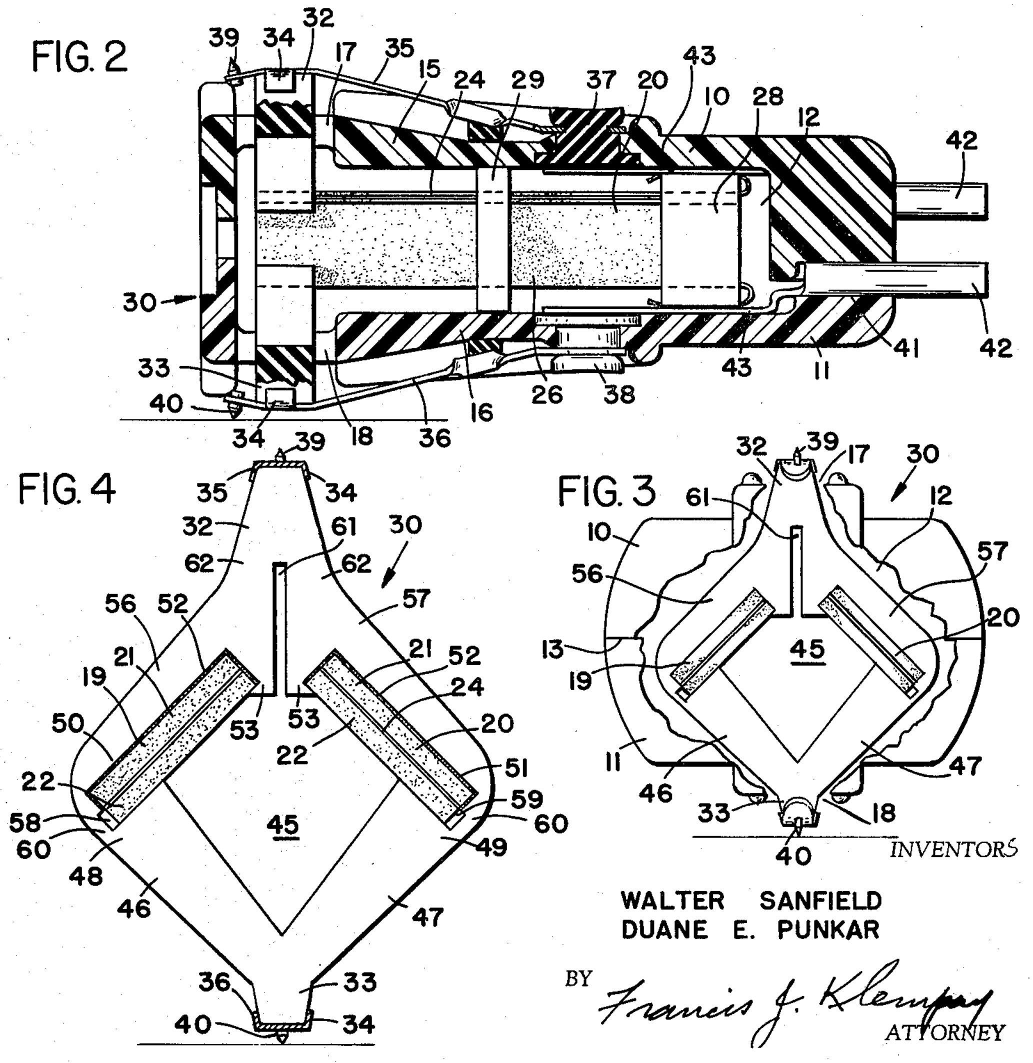
FIGURE 2 is a side sectional view taken generally along the section line II—II of FIGURE 1.
FIGURE 3 is a front elevational view of the phonograph pickup cartridge shown in FIGURES 1 and 2 with portions of the housing halves broken away.
FIGURE 4 is an enlarged front elevational view showing specifically the coupling member or nosepiece and the pair of transducer elements employed in the phonograph pickup cartridge.

Referring now to the drawing, and initially to FIGURES 1–3 thereof, the reference numerals 10 and 11 designate upper and lower housing halves, respectively. The housing halves 10 and 11 are formed, by molding, for example, of plastic or other suitable material to the shapes shown in the various views of the drawing and, when these housing halves are assembled in complementary relation, they define a housing having a large longitudinally extending internal cavity 12 therein. The inner edges 13 of the housing halves are abutted and the housing halves are held in assembled relation by a vertically extending tubular rivet 14, for example. The upper and lower major faces of the housing halves 10 and 11 define upper and lower walls 15 and 16 of the housing and these walls adjacent their front ends have upper and lower rectangular openings 17 and 18 therein which provide limited access into the internal cavity 12 of the housing.

Receiving within the internal cavity 12 of the housing is the transducer assembly of the phonograph pickup cartridge which comprises a pair of piezoelectric bender type transducer elements 19 and 20. Each of the transducer elements 19 and 20 is a well known "bimorph" comprising a pair of piezoelectric plates 21 and 22 separated by a polarizing electrode 24 and provided with the external electrodes 25 and 26 on its major exposed surface areas. Upon deflection of either transducer element in a direction normal to the plane of its major exposed surface areas an electrical signal will be evidenced across the electrodes 25 and 26 which is proportional to the amount of deflection or bending of the transducer element.

The transducer elements are resiliently clamped in an elastic clamp bushing 28 at their rear ends and adjacent the rear end of the internal cavity 12 of the housing. The transducer elements 19 and 20 are surrounded at an area intermediate their ends by a resilient bender bushing 29 which serves as a fulcrum over which the transducer elements are adapted to be bent. A coupling member or nosepiece generally designated by the reference numeral 30 is rigidly mounted on the free forward ends of the transducer elements 19 and 20 and, as will be hereinafter more fully explained, the coupling member 30 is adapted to transmit preselected driving forces to one or both of the transducer elements in a desired manner. It is sufficient for the present to note that the coupling member 30 provides a pair of vertically spaced and vertically extending tapered stylus engaging arms 32 and 33 which project outwardly through the openings 17 and 18 in the upper and lower walls 15 and 16 of the housing halves 10 and 11, respectively.

In the various views of the drawing it will be observed that the transducer elements 19 and 20 are disposed at an angle with respect to a vertical center line through the phonograph pickup cartridge. This aligns both of the transducer elements in a preferred direction with respect to the mechanical undulations or modulations in the record grooves of the various types of record discs which are adapted to be played. The transducer elements are of the bender type whereby they are sensitive to bending forces applied normally to the planes of their major surface areas. The phonograph pickup cartridge disclosed herein differs from prior art devices since the same generally employ twister type transducer elements. The use of bender type transducer elements contributes quite materially to the increased output and to the improved compliance of the present phonograph pickup cartridge.

The outwardly projecting flattened and tapered ends of the stylus engaging arms 32 and 33 of the coupling member 30 are resiliently engaged by trough-like portions 34 of two stylus supporting members 35 and 36. The stylus supporting members 35 and 36 may conveniently be formed, by stamping, for example, from resilient spring-like material and in accordance with the teachings of copending U.S. Patent No. 2,957,052. The rear bifurcated ends of the stylus supporting members 35 and 36 are secured to the cartridge housing by resilient buttons 37 and 38 in accordance with the teachings of U.S. Patent No. 3,000,639. Both of these above mentioned patents are assigned to the assignee of the present invention. The forward ends of the stylus mounting members 35 and 36 carry stylus tips 39 and 40, respectively. The stylus tip 39 is preferably of a size adapted for use in playing coarse record discs while the stylus tip 40 is of a smaller size for use in playing microgroove record discs. The disclosed arrangement affords extremely efficient drive connections between the stylus tips 39 and 40 and their respective associated stylus engaging arms 32 and 33 of the coupling member 30. The anchoring of the stylus supporting arms 35 and 36 by the resilient buttons 37 and 38 affords a highly simplified arrangement for allowing replacement of the stylus mounting members and the stylus tips from time to time as is desired.

Clamped between the upper and lower housing halves 10 and 11 and located in the integrally formed recesses 41 therein are four terminal pins 42 which extend outwardly and rearwardly of the cartridge housing. Terminal pins 42 provide electrical connections—in combination with suitable leads, not specifically shown—for conducting the electrical outputs of the transducer elements to suitable amplifying apparatus, not shown. The elongated and flattened inner ends 43 of the terminal pins 42 are disposed in pairs laying against the top and bottom walls 15 and 16 of the cartridge housing. Conventional metal foil leads, not particularly shown, provide electrical contact between the elongated portions 43 of the terminal pins 42 and the various external electrodes of the transducer elements. The arrangement is such that each of the external electrodes of both transducer elements is electrically connected to one of the terminal pins 42.

The coupling member 30, which is extremely important in accomplishing the objects of the present invention, comprises a generally diamond-shaped body portion of elastomeric compliant and resilient material whose upper and lower ends terminate in the previously described flattened and tapered stylus engaging arms 32 and 33. It is the function of the coupling member to transfer or transmit mechanical drive forces experienced by either of the stylus tips in a desired manner to one or both of the transducer elements 19 and 20.

The resilient and compliant diamond-shaped coupling member 30 has a generally triangularly shaped aperture 45 therethrough and it will be noted that the base of this generally triangularly shaped aperture 45 is disposed adjacent the uper tapered stylus engaging arm 32 while the apex of this aperture opposite the above mentioned base is disposed closely adjacent to and vetrically aligned with the lower tapered stylus engaging arm 33. There are thus defined a pair of inwardly and downwardly directed drive levers 46 and 47 whose lower ends terminate in the lower stylus engaging arm 33 and whose upper ends 48 and 49 are spaced transversely with respect to each other and are of substantially greater thickness dimension than the lower ends thereof. The upper ends of the drive levers 46 and 47 terminate at and define a portion of the sidewalls for a pair of generally rectangular slots 50 and 51 which extend upwardly and inwardly. The transducer elements 19 and 20 have their ends received within the rectangular slots 50 and 51 and are securely cemented thereto by means of layers of cement 52. The lower face of the transducer element 19 is engaged by the upper end 48 of the drive lever 46 adjacent one side edge thereof and by a hook-like projection 53 adjacent the other side edge thereof. The lower face of the transducer element 20 is similarly engaged by the upper end 49 of the drive lever 47 and a second hook-like portion 53. It will be noted that the major plane of the transducer element 19 is disposed in generally normal relation with respect to the drive lever 46 and in general parallel relation with respect to the drive lever 47. Also, the transducer element 20 is disposed in parallel relation to the drive lever 46 and generally normal relation with respect to drive lever 47. As previously mentioned, the transducer elements 19 and 20 are disposed in angled relation with respect to the horizontal surface of a record disc.

The angularly inclined rectangular slots 50 and 51 define a second set of upwardly and inwardly extending drive levers 56 and 57 which terminate in the upper tapered stylus engaging arm 32. It will be noted that portions of the upper drive levers 56 and 57 engage and are cemented to the entire upper major surfaces of and extend in general parallel relation with respect to the transducer elements 19 and 20, respectively.

The rectangular slots 50 and 51 are notched at 58 and 59 to establish a pair of hinge areas 60 adjacent the lower corners of the transducer elements 19 and 20 which interconnect the first mentioned drive levers with the second set thereof. Thus, one of the hinge areas 60 interconnects the drive levers 46 and 56 while the other of the hinge areas joins drive levers 47 and 57.

A vertically extending slot 61 extends upwardly from the base of the triangularly shaped opening 45 between and above the transducer elements 19 and 20 toward the upper tapered stylus engaging arm 32. This slot, as it approaches the inwardly tapering side edges of the upper stylus engaging arm 32, defines and separates two areas 62 of substantially restricted extent which serve as hinge areas about which certain bending of the coupling member 30 is allowed to occur.

The hinge areas 62 permit relatively free swinging movement of the related pairs of the drive levers—46, 56 and 47, 57—with respect to each other and the vertically extending slot 61 very effectively separates the pairs of drive levers so that each may move freely without reference to or dependence upon the movement of the other of the pairs. Transducer elements 19 and 20, being very securely attached to the drive levers 56 and 57, are thus free to bend individually under the urging of the drive levers. The relatively long extent of the pairs of drive levers and the looseness or flexibility of the hinge areas 62 insure that the transducer elements are never subjected to any twisting or turning forces but rather are acted upon only by rectilinear forces applied against their major faces. The arrangement is such that extremely efficient transduction from mechanical to electrical signals takes place whereby the phonograph pickup cartridge has greatly improved output characteristics. Also, the overall compliance of the phonograph pickup cartridge is substantially increased while yet, when playing stereophonic record discs, the separation between the two channels of recorded intelligence is maintained at a maximum. It will be noted that the coupling member is characterized by its relatively light weight and low mass which contributes to the overall compliance of a phonograph pickup cartridge.

Considering now the operation and utilization of the phonograph pickup cartridge above described in playing the most widely employed types of phonograph record discs now in existence, reference should be had to FIGURES 5 through 9 of the drawing. In each of these views the coupling member 30, the stylus tips 39 and 40 and the transducer elements 19 and 20 are shown in operative relation with respect to the surface of a record disc for sensing, transmitting and transducing the mechanical undulations or modulations in the record groove.

Figures 5, 6, 7, 8, 9:
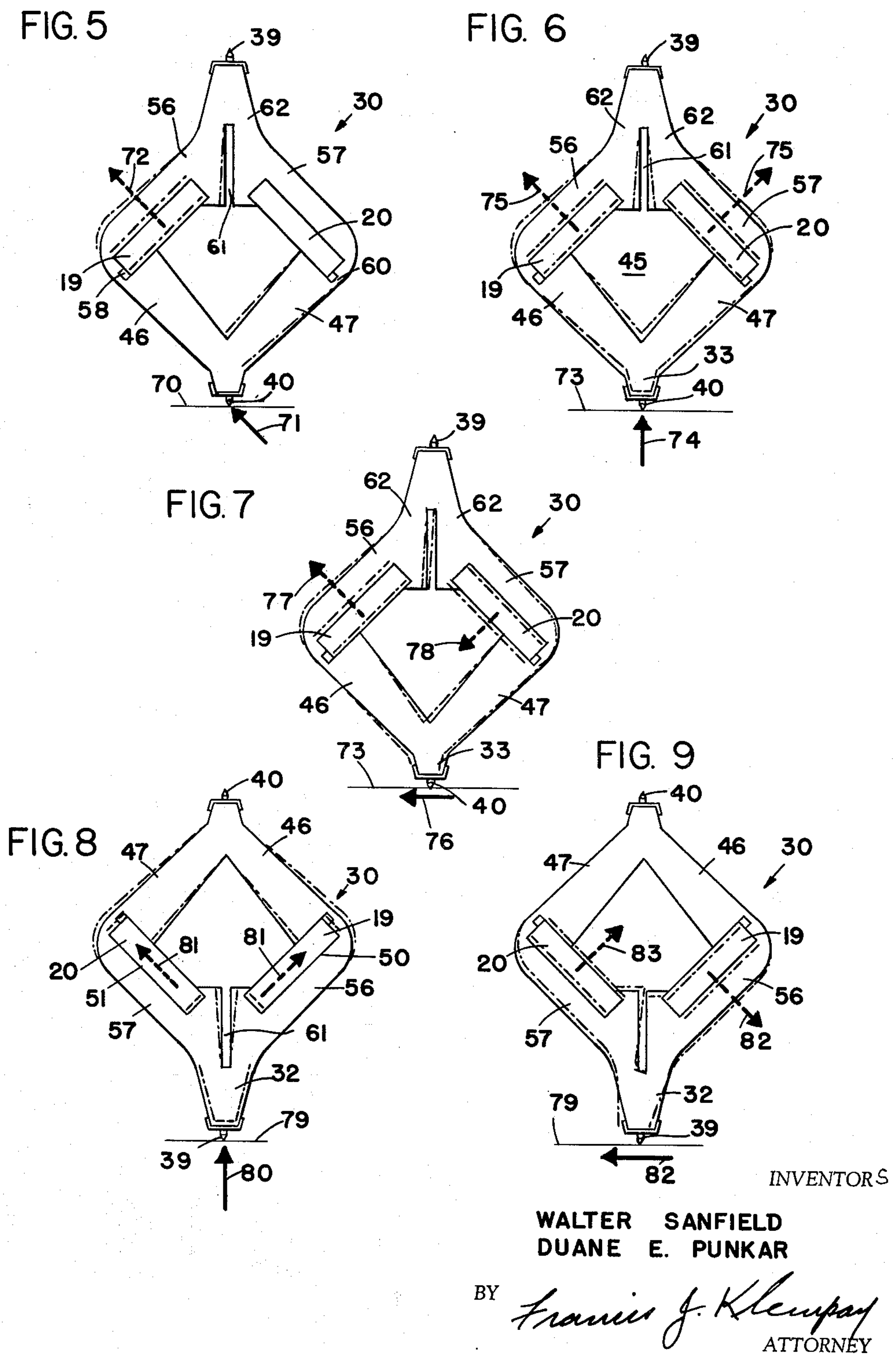
FIGURE 5 is a schematic showing of the coupling member and the transducer elements of our universal monaural-binaural phonograph pickup cartridge when employed in playing 45–45 type of microgroove stereophonic record discs.
FIGURES 6 and 7 are schematic views similar to FIGURE 5 showing the employment of the coupling member and transducer elements in playing lateral cut type of microgroove monaural record discs.
FIGURES 8 and 9 are schematic front elevational views showing the disposition and use of the coupling member and transducer elements in playing lateral cut type of coarse monaural record discs.

FIGURE 5 shows schematically the action occurring when the phonograph pickup cartridge is utilized in playing a 45–45 type of microgroove stereophonic record disc 70. The phonograph pickup cartridge is so disposed that the stylus tip 40 engages the groove in the record disc. Since the intelligence is recorded in two channels at angles of forty-five degrees with respect to the horizontal surface of the record disc it is essential that each of the transducer elements 19 and 20 be receptive to only those undulations or modulations occurring on the respective side wall of the record groove with which it is operatively associated. Assuming that a force, represented by the arrow 71, is applied upwardly and to the left at forty-five degrees with respect to the surface of the record disc, such a force will be sensed by the stylus tip 40 and will be transmitted longitudinally of the drive lever 46, to the widened upper end 48 thereof and against the underside of the forward end of transducer element 19. This causes the transducer element 19 to be bent in the direction indicated by the broken arrow 72. The bending of the transducer element 19 results in an electrical output which is evidenced as a difference in potential between the terminal pins 42 associated with the external electrodes 25 and 26 of this transducer element.

The same force represented by the arrow 71 also acts upon the drive lever 47, but this latter member bends in its weaker direction without transmitting any compressive force to the transducer element 20. The force applied is generally parallel to the drive lever 46 whereby substantially all of the force is transmitted directly to the transducer element 19. The force is applied generally normal to the drive lever 47 in transverse relation to its major axis whereby the drive lever 47 acts, at this time, as an easily bent beam. Transducer element 20 is disposed with its major faces parallel to the direction of the force in this case and it will not respond electrically even if mechanical force of this sense was transmitted to it by the drive lever 47.

It should be apparent that a force applied to the stylus tip 40 from the opposite channel of the record groove would result in a condition opposite to that above described—the force would be transmitted through the drive lever 47 to cause bending of the transducer element 20 while the transducer element 19 would not be bent and would not provide an electrical output. It should be understood that in normal practice a composite force comprising forces from both of the channels in the record groove will be applied to the stylus 40 to continuously exercise a change in effect on both transducer elements 19 and 20. However, as set forth above, separation between the two channels is maintained in a maximum through the use of the phonograph pickup cartridge of the present invention.

In FIGURES 6 and 7 the apparatus is shown as used playing a lateral cut type of microgroove monaural record disc 73. No physical change in position of the phonograph pickup cartridge is required and the stylus tip 40 engages the groove in the record disc. The single channel is modulated laterally in the record groove and it is highly desirable that a phonograph pickup cartridge for use in playing record discs of this type should be insensitive to vertical motions of the stylus. This insures against reproduction of extraneous noise and in particular eliminates any output due to pinch effect.

When a vertical force, represented by the arrow 74 in FIGURE 6 of the drawing, is applied to the stylus tip 40 the force causes the coupling member 30 to assume the general position shown by the broken lines. The lower tapered stylus engaging arm 33 moves in a vertical direction and the downwardly and inwardly inclined drive levers 46 and 47 bend inwardly toward each other while the upper drive levers 56 and 57 move upwardly and away from each other. This relative movement between the pairs of drive levers 46, 56 and 47, 57 is readily permitted due to the hinge areas 62 provided by the vertical slot 61. An equal bending force represented by broken arrow 75 is thus applied to the ends of both the transducer elements 19 and 20 whereby output signals are produced by both of the transducer elements 19 and 20. The transducer elements 19 and 20 have their electrode areas so connected to the terminal pins 42 that the output signals produced under the condition above described are of opposite polarity and are out of phase. Elements 19 and 20 provides signals which are equal in magnitude—each of the elements is bent to the same extent due to the operation of the coupling member 30 and the disposition of the transducer elements—and since they are of opposite polarity and out of phase they may effectively cancel out each other. Such cancelling may be achieved in the amplifier apparatus or may be permitted to occur acoustically after the signals have left the two respective sources of sound asosciated with the amplifier apparatus. The transducer elements 19 and 20 are arranged to respond equally to purely vertical components of motion applied to the stylus tip 40 in such a manner that the two signals thus derived cancel each other and the net result is that extraneous noise, etc., is completely eliminated. It will be noted that in playing stereophonic record discs a purely vertical motion can occur as the vector of two equal and simultaneous forty-five degree signals. However, in this instance, the reproducing circuit and speakers are arranged to handle the two resultant signals separately and no cancellation occurs.

When the stylus tip 40 is subjected to lateral forces, such as represented by the arrow 76 in FIGURE 7 of the drawing, the lower tapered stylus engaging arm 33 is displaced laterally to the left. Upward pressure is exerted on drive lever 46 while tension is applied downwardly on the drive lever 47. At the same time the drive lever 56 hinges upwardly about hinge area 62 while the drive lever 57 hinges downwardly about its associated hinge area. The arrangement is such that an upward bending force 77 is applied to the transducer element 19 while a downward bending force 78 is applied to the transducer element 20. The two output signals provided by the transducer elements 19 and 20 are of equal magnitude, like polarity and in phase. The result of this arrangement is a faithful reproduction of the lateral intelligence recorded in the record groove. Of course, a lateral force applied to the right would cause downward bending of the transducer element 19 and upward bending of the transducer element 20.

When it is desired to reproduce a lateral cut type coarse monaural record disc 79, it is necessary to reverse or rotate the position of the phonograph pickup cartridge. This is accomplished most efficiently by turning over the phonograph pickup cartridge and its mounting hardware, not shown, to bring the stylus tip 39 into operative relation with respect to the record disc 79.

In playing such a record disc it is desirable to render the transducer elements 19 and 20 insensitive to vertical forces and the arrangement for accomplishing this is shown in FIGURE 8 of the drawing. A vertical force, represented by the arrow 80, applied to the stylus tip 39 causes vertical movement of the tapered stylus engaging arm 32 which results in a spreading of the slot 61 and an upward thrust on both of the drive levers 56 and 57. Since the drive levers 56 and 57 are rigidly attached or cemented to the transducer elements the upward thrust of the drive levers 56 and 57 is transmitted to the transducer elements as edge forces applied in the direction of the arrows 81. Being bender type transducer elements, the transducer elements 19 and 20 are insensitive to forces and these directions and no electrical output across any of the output terminal pins 42 is derived under these conditions.

However, when a lateral force 82 is applied as shown in FIGURE 9 the stylus tip 39 and the tapered stylus engaging arm 32 move laterally to the left. The drive lever 57 is caused to move upwardly and to the right while the drive lever 56 moves downwardly and to the right. The transducer elements 19 and 20 are cemented to the drive levers 56 and 57 and stresses are produced in the transducer elements 19 and 20 in the direction indicated by the arrows 82 and 83, respectively. The outputs of the transducer elements are thus of equal magnitude, of like polarity and are in phase for producing a high resultant output.

It should thus be apparent that we have accomplished the objects initially set forth by providing a phonograph pickup cartridge which is universally compatible with and useful in an improved manner in playing the most widely employed types of record discs. The phonograph pickup cartridge is adapted to reproduce both stereophonic and monaural recordings and new and novel coupling means are provided for drivingly interconnecting the two different stylus tips with the pair of transducer elements. The use of bender type transducer elements—as opposed to the twister type embodied in many prior art devices—in combination with the coupling means provides excellent separation between the two stereophonic channels while maintainiing a high output and superior compliance. The organization of these elements renders the transducer elements insensitive to undesirable applied forces and this is particularly important for the efficient reproduction of monaural recordings.

It should thus be apparent that we have accomplished the objects initially set forth. Many changes may be made in the disclosed embodiment of the invention without departing from the clear teachings thereof. Accordingly, reference should be had to the following appended claim in determining the true scope and intent of the invention.

We claim:

A phonograph pickup cartridge comprising a cartridge housing, a pair of elongated and forwardly extending piezoelectric transducer elements mounted in said housing, a pair of stylus supporting members mounted on said housing on opposite sides of said transducer elements, each of said stylus supporting members carrying a groove engaging tip, a coupling member interconnecting said stylus supporting members and the forward free ends of said transducer elements and being carried by said elements, said coupling member comprising a mass of resilient and compliant material, said coupling member being generally diamond shaped in front elevation, said stylus supporting members engaging said coupling member at two opposite corners thereof, said transducer elements engaging and carrying said coupling member at the other two opposite corners thereof, a through-aperture in said coupling member, a pair of angularly related slots in said coupling member adjacent said other two opposite corners thereof, said transducer elements being received within and glued to the edges of said angularly related slots, said coupling member comprising a pair of upwardly and outwardly diverging leg portions extending from one of said corners engaged by one of said stylus supporting members, said rectangular slots being partially open along the inner adjacent faces thereof, the upper ends of said leg portions defining an edge portion of said slots for engaging said transducer elements along one set of side edges thereof, hook-like projections forming another portion of said slots, and said projections engaging said transducer elements along the other set of side edges thereof.

References Cited by the Examiner

UNITED STATES PATENTS

| | | | |
|---|---|---|---|
| 2,093,540 | 9/37 | Blumlein. | |
| 2,114,471 | 4/38 | Keller et al. | 179—100.4 |
| 2,328,952 | 9/43 | Burt | 179—100.41 |
| 2,479,894 | 8/49 | Andrews | 179—100.41 |
| 2,484,950 | 10/49 | Jaffe | 179—100.41 |
| 2,769,867 | 11/56 | Crownover et al. | 310—8.5 |
| 2,934,610 | 4/60 | Dieter | 179—100.41 |
| 2,944,118 | 7/60 | Gray | 179—100.41 |
| 2,991,331 | 7/61 | Ross | 179—100.41 |
| 2,997,548 | 8/61 | De Vries | 179—100.41 |
| 3,060,280 | 10/62 | Wood | 179—100.41 |
| 3,055,989 | 9/62 | Bachman et al. | 179—100.41 |
| 3,102,171 | 8/63 | Laux | 179—100.41 |

FOREIGN PATENTS

| | | |
|---|---|---|
| 565,959 | 4/58 | Belgium. |

OTHER REFERENCES

Batsch: German printed application T 11,092, Dec. 13, 1956.

IRVING L. SRAGOW, *Primary Examiner.*

L. MILLER ANDRUS, NEWTON N. LOVEWELL, *Examiners.*